(12) United States Patent
Hsu

(10) Patent No.: US 6,647,170 B2
(45) Date of Patent: Nov. 11, 2003

(54) OPTICAL SWITCHING SYSTEM THAT USES MOVABLE MICROSTRUCTURES TO SWITCH OPTICAL SIGNALS IN THREE DIMENSIONS

(75) Inventor: Ying Wen Hsu, Huntington Beach, CA (US)

(73) Assignee: Newport Opticom, Inc., Newport Beach, CA (US)

( * ) Notice: Subject to any disclaimer, the term of this patent is extended or adjusted under 35 U.S.C. 154(b) by 22 days.

(21) Appl. No.: 09/837,817

(22) Filed: Apr. 17, 2001

(65) Prior Publication Data

US 2002/0034353 A1 Mar. 21, 2002

Related U.S. Application Data

(60) Provisional application No. 60/233,672, filed on Sep. 19, 2000.

(51) Int. Cl.$^7$ ................................................ G02B 6/42
(52) U.S. Cl. ........................ 385/17; 385/25; 385/31
(58) Field of Search ............................ 385/17, 16, 25, 385/31

(56) References Cited

U.S. PATENT DOCUMENTS

| | | | |
|---|---|---|---|
| 4,693,547 A | 9/1987 | Soref et al. ............ 350/96.13 |
| 5,235,672 A | 8/1993 | Carsin ...................... 395/24 |
| 5,245,458 A | 9/1993 | Taylor ..................... 359/108 |
| 5,757,986 A | 5/1998 | Crampton et al. ............ 385/2 |
| 5,761,350 A | 6/1998 | Koh ......................... 385/14 |
| 5,828,800 A | 10/1998 | Henry et al. ................ 385/20 |
| 5,923,798 A | 7/1999 | Aksyuk et al. ............... 385/19 |
| 5,990,473 A | 11/1999 | Dickey et al. ........ 250/231.13 |
| 6,072,924 A | 6/2000 | Sato et al. .................. 385/18 |
| 6,101,299 A * | 8/2000 | Laor ........................ 385/16 |
| 6,137,941 A | 10/2000 | Robinson ................... 385/140 |
| 6,148,124 A | 11/2000 | Aksyuk et al. ............... 385/24 |
| 6,205,267 B1 | 3/2001 | Aksyuk et al. ............... 385/19 |
| 6,219,472 B1 * | 4/2001 | Horino et al. ................ 385/16 |
| 2002/0094151 A1 * | 7/2002 | Li ........................... 385/17 |

FOREIGN PATENT DOCUMENTS

EP    1004910 A2    5/2000    ............ G02B/6/35

OTHER PUBLICATIONS

Benaissa, K.; and Nathan, A.; "Silicon Anti-Resonant Reflecting Optical Waveguides for Sensor Applications;" *Journal of Sensors and Actuators (A Physical)*, Vol. A65, 33–44, 1998.

Broekemoto, Takuji; Noguchi, Yutaka; et al.; "Polyimide Optical Waveguides With Multi–Fan–Out for Multi–Chip Module Application;" *Processings of the 27$^{th}$ European Solid–State Device Research Conference*, France, Sep. 22–24, 1997.

(List continued on next page.)

*Primary Examiner*—Rodney Bovernick
*Assistant Examiner*—Sung Pak
(74) *Attorney, Agent, or Firm*—Orrick, Herrington & Sutcliffe LLP

(57) ABSTRACT

An optical switching system that switches optical signals in three dimensions by moving an optically transmissive microstructure. The movable microstructure is "optically transmissive" because it includes structures such as waveguides and waveguide networks. The apparatus uses MEMS and micro-machining technology to build an optical switch having an optically transmissive microstructure which moves from one position to another position in a direction (e.g., laterally, vertically, rotationally) such that incoming optical signals align over a small air gap with different waveguides, or with different inputs to the waveguides, depending on the position of the movable microstructure. As a result, the optical signals travel different optical paths (e.g., straight pass through or cross over) depending on the position of the movable microstructure. By combining optical switches in both the vertical and horizontal directions, the resulting optical switching system handles switching in three dimensions.

63 Claims, 8 Drawing Sheets

OTHER PUBLICATIONS

Brown, K.S.; Taylor, B.J.; Dawson; J.M.; Hornak, L.A.; "Polymer Waveguide Co–integration With Microelectromechanical Systems (MEMS) for Integrated Optical Metrology;" *Proceedings of the SPIE (The International Society for Optical Engineering),* Vol. 3276, 1998.

Burcham, Kevin E.; and Boyd, Joseph T.; "Freestanding, Micromachined, Multimode Silicon Optical Waveguides at $\lambda=1.3\,\mu m$ for Microelectromechanical System Technology;" *Journal of Applied Optics,* Vol. 37, No. 36, Dec. 20, 1998.

Churenkov, A.V.; "Silicon Micromechanical Optical Waveguide for Sensing and Modulation;" *Journal of Sensors and Actuators (A Physical),* Vol. A57, No. 1, Oct. 1996.

Cook, J.P.D.; Este, G.O.; Shepherd, F.R.; et al.; "Stable, Low–Loss Optical Waveguides and Micromirrors Fabricated in Acrylate Polymers" *Applied Optics Journal,* Vol. 37, No. 7, Mar. 1, 1998.

Cornett, Kimberly T.; Heritage, Jonathan P.; Solgaard, Olav; "Compact Optical Delay Line Based on Scanning Surface Micromachined Polysilicon Mirrors;" *2000 IEEE/LEOS International Conference on Optical MEMS,* Kauai, Hawaii, Aug. 21–24, 2000.

de Labachelerie, M.; Kaou, N.; et al.; "A Micromachined Connector for the Coupling of Optical Waveguides and Ribbon Optical Fibers;" *Journal of Sensors and Actuators (A Physical),* Vol. A89, No. 1–2, Mar. 20, 2001.

Eng, Terry T.H.; Kan, Sidney C.; and Wong, George K.L.; "Voltage–Controlled Micromechanical SOI Optical Waveguides;" *IEEE TENCON, IEEE Region 10 International Conference on Microelectronics and VLSL—"Asia Pacific Microelectronics 2000"—Proceedings,* 1995.

Eng, Terry T.H.; Kan, Sidney C.; and Wong, George K.L.; "Surface–Micromachined Epitaxial Silicon Cantilevers as Movable Optical Waveguides on Silicon–on–Insulator Substrates;" *Journal on Sensors and Actuators A, Physical,* Vol. A49, No. 1–2, Jun. 1995.

Eng, Terry T.H.; Kan, Sidney C.; and Wong, George K.L.; "Surface–Micromachined Movable SOI Optical Waveguides;" *Proceedings of the International Solid–State Sensors and Actuators Conference—Transducer,* 1995.

Gorecki, Christopher; "Optimization of Plasma–Deposited Silicon Oxinitride Films for Optical Channel Waveguides;" *Journal of Optics and Laser Engineering,* Vol. 33, No. 1, Jan. 2000.

Haronian, D.; "Bottlenecks of Opto–MEMS;" *SPIE Proceedings—Micro–Opto–Electro–Mechanical Systems,* Glasgow, UK, May 22–23, 2000.

Haronian, D.; "Displacement Sensing Using Geometrical Modulation in Reflection Mode (GM–RM) of Coupled Optical Waveguides;" *Journal of Micromechanics and Microengineering,* Vol. 8, No. 4, Dec. 1998.

Haronian, D.; "Suspended Optical Waveguide With In–Plane Degree of Freedom or Microelectro–Mechanical Applications;" *Electronics Letters,* Vol. 34, No. 7, Apr. $2^{nd}$ 1998.

Hoffmann, Martin; Kopka, Peter; and Voges, Edgar; "Thermooptical Digital Switch Arrays in Silica–on–Silicon With Defined Zero–Voltage State;" *Journal of Lightwave Technology,* Vol. 16, No. 3, Mar. 1998.

Jin, Young–Hyun; Seo Kyoung–Sun; et al.; "An SOI Optical Microswitch Integrated With Silicon Waveguides and Touch–down Micromirror Actuators;" 2000 IEEE/LEOS International Conference on Optical MEMS, Aug. 21–24, 2000.

Koyanagi, Mitsumasa; "Optical Interconnection Using Polyimide Waveguide for Multi–Chip Module;" *Proceedings of SPIE, Society of Photo–Optical Instrumentation Engineers,* San Jose, CA, 1996.

Kruger, Michiel V.P.; Guddal, Michael H.; et al.; "Low Power Wireless Readout of Autonomous Sensor Wafer Using MEMS Grating Light Modulator;" *2000 IEEE/LEOS International Conference on Optical MEMS,* Kauai, Hawaii, Aug. 21–24, 2000.

Kuwana, Yasuhiro; Hirose, Akinori; Kurino, Hiroyuki; et al.; "Signal Propagation Characteristics in Polyimide Optical Wave–guide With Micro–Mirrors for Optical Multichip Module;" *Japanese Journal of Applied Physics,* Vol. 38, No. 4B, Apr. 1999.

Makihara, M.; "Microelectromechanical Intersecting Waveguide Optical Switch Based on Thermo–Capillarity;" *2000 IEEE/LEOS International Conference on Optical MEMS,* Kauai, Hawaii, Aug. 21–24, 2000.

Makihara, M.; Sato, Makoto; Shimokawa, Fusao; et al., "Micromechanical Optical Switches Based on Thermocapillary Integrated in Waveguide Substrate;" *Journal of Lightwave Technology,* Vol. 17, No. 1, Jan. 1999.

Makihara, M.; Shimokawa, F.; and Nishida, Y.; "Self–Holding Optical Waveguide Switch Controlled by Micromechanism;" *IEICE Trans. Electronics (Japan),* Vol. E80–C, No. 2, Feb. 1997.

Maoisel, J.; Guttmann, J.; Huber, H.P.; et al.; "Optical Backplanes With Integrated Polymer Waveguides;" *Journal of Optical Engineering,* Vol. 39, No. 3, Mar. 2000.

Maruo, Shoji; Ikuta, Koji; and Ninagawa, Toshihide; "Multi–Polymer Microstereolithography for Hybride Opto–MEMS" has the same information as "Advanced Micro Sterelithography with Multi UV Polymers (System Development and Application to Three–Dimensional Optical Waveguides)," which is written in Japanese; *Journal of Transactions on the Institute of Electrical Engineers of Japan,* Part E, Vol. 120–E, No. 7, Jul. 2000.

Matsumoto, Takuji; Kuwana, Yasuhiro; Hirose, Akinori; "Polyimide Optical Waveguide With Multi–Fan–Out for Multichip Module System;" *Proceedings from the Optoelectronic Interconnects V,* Vol. 3288, San Jose, CA Jan. 28–29, 1998.

Matsumoto, Takuji; Fukuoka, Takeshi; Kurino, Hiroyuki; et al.; "Polyimide Optical Waveguide With Multi–Fan–Out for Multi–Chip Module Application;" *Proceedings of the $27^{th}$ European Solid–State Device Research Conference,* France, Sep. 22–24, 1997.

Mueller, Raluca; Pavelescu; and Manea, Elena; "3D Microstructures Integrated With Optical Waveguides and Photodiodes on Silicon," *MELECOB 1998 $9^{th}$ Mediterranean Electromechanical Conference Proceedings,* Vol. 1; May 18–20, 1998.

Namba, Tohru; Uehara, Akihito; et al.; "High–Efficiency Micromirrors and Branched Optical Waveguides on Si Chips;" *Japanese Journal of Applied Physics,* Part 1, Vol. 35, No. 2B, Aug. 21–24, 1995.

Oillier, Eric; Chabrol, Claude; et al.; "1×8 Micro–Mechanical Switches Based on Moving Waveguides for Optical Fiber Network Switching;" *2000 IEEE/LEOS International Conference on Optical MEMS*, Aug. 21–24, 2000.

Ollier, Eric; and Mottier, P.; "Micro–Opto–Electro–Mechanical Systems: Recent Developments and LEIT's Activities," *Proceedings of the SPIE—The International Society for Optical Engineering*, Vol. 4076, May 22–24, 2000.

Shubin, I.; and Wa, P.L.K.; "Electrostatically Actuated 1 × 2 Micro–Mechanical Optic Switch;" *Electronics Letters*, Vol. 37, No. 7; Mar. 29, 2001.

Storgaard–Larsen, Torben; "Plasma–Enhanced Chemical Vapor Deposited Silicon Oxynitride Films for Optical Waveguide Bridges for Use in Mechanical Sensors;" *Journal of the Electromechanical Society*, Vol. 144, No. 4, Apr. 1997.

Voges, E.; Hoffmann, M.; "FB1 Optical Waveguides on Silicon Combined With Micromechanical Structures;" *Advanced Applications of Lasers in Materials and Processing; LEOS Summer Optical Meeting*, 1996; IEEE, Piscataway, New Jersey, 96TH8154.

Yokoyama, S.; Nagata, T.; and Kuroda, Y.; et al.; "Optical Waveguides on Silicon Chips;" *Journal of Vacuum Science & Technology A*, Vol. 13, No. 3, May–Jun. 1995.

\* cited by examiner

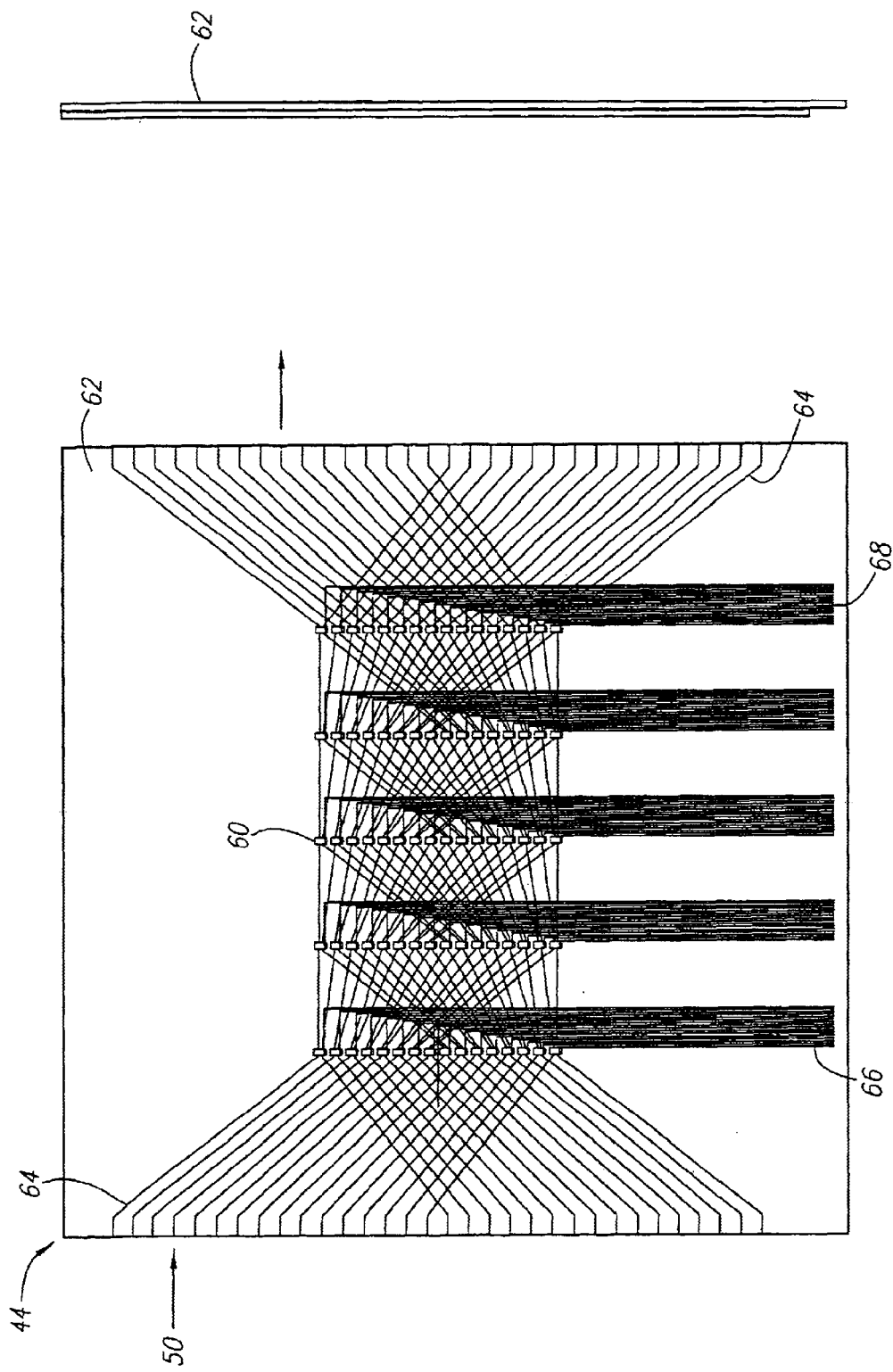

OPTICAL SWITCHING SYSTEM THAT USES MOVABLE MICROSTRUCTURES TO SWITCH OPTICAL SIGNALS IN THREE DIMENSIONS

CROSS-REFERENCE TO RELATED APPLICATIONS

This patent application is related to, and claims priority to, provisional U.S. patent application Ser. No. 60/233,672 by Ying Wen Hsu, filed on Sep. 19, 2000 and titled "Method for switching optical signals using microstructures."

BACKGROUND OF THE INVENTION

1. Field of the Invention

This field of the invention relates generally to a class of devices and integration of an array of these devices into a system for switching optical signals in three dimensions, such as in both the vertical and horizontal directions. In particular, the devices are made with materials and processes that are compatible with the prevalent semiconductor manufacturing practice, hence capable of producing products in high volume and low cost.

2. Background

The interest in these devices has been driven by the tremendous increase in demand for more usage and faster communications systems, i.e. greater bandwidth, in the telecommunication industry. The prime examples of applications that are pushing this demand are the Internet, video/music on demand, and corporate data storage. The existing telecommunication infrastructure, which was largely developed for telephone calls, is now incapable of meeting the demands for new applications of data communication.

Several options have been developed to meet this new demand. These options include wireless, optical, and free-space laser communication technologies. To date, the most promising technology capable of meeting the projected bandwidth requirements of the future is the optical technology.

In an all optical network, or in a combination of an optical and electrical network, the necessary components include a signal carrier medium (i.e. optical fiber), signal routing systems, and data control systems. These signal routing systems have devices which switch optical signals between optical fibers.

In the prior art approaches, the switching of optical signals can be accomplished in predominantly two major approaches: electrical and optical. Today, most systems use electrical switching. In these systems, at the network junctions, the optical signals must first be converted into electrical signals. The converted electrical signals are then switched to the designated channel by integrated circuits. Lastly, the electrical signals must be converted back into optical signals before the signals can be passed onto the optical fiber toward the next destination. Such optical converters are relatively expensive compared to the rest of the transmission equipment.

Electrical switching technology is reliable, inexpensive (except for optical converters), and permits signal reconditioning and monitoring. The main drawback with electrical switching systems is that the number of junctions in a long distance network can be large, and the total cost of converters is very high. Furthermore, typically more than 70% of signals arriving at a junction require only simple straight pass-through, and conversion (down and up conversions) of the full signal results in inefficient use of hardware. System designers also anticipate that future systems are best served by transparent optical switch capabilities; that is, switching systems capable of redirecting the path of the optical signal without regard to the bit rate, data format, or wavelength of the optical signal between the input and output ports. Most electrical switching systems are designed for a specific rate and format, and cannot accommodate multiple and dynamic rates and formats. Future systems will also be required to handle optical signals of different wavelengths, which in an electrical switching network would necessitate the use of separate channels for each wavelength. These limitations of the electrical switching system provide new opportunities for the development of improved optical switching systems.

A switch that directly affects the direction of light path is often referred to as an Optical Cross Connect (OXC). Conventional optical fabrication techniques using glass and other optical substrates cannot generate products that meet the performance and cost requirements for data communication applications. Unlike the electrical switching technique that is based on matured integrated circuit technology, optical switching (ones that can achieve high port count) depends on technologies that are relatively new. The use of micromachining is one such new approach. The term MEMS (Micro Electro-Mechanical Systems) is used to describe devices made using wafer fabrication process by micromachining (mostly on silicon wafers). The batch processing capabilities of MEMS enable the production of these devices at low cost and in large volume.

MEMS-based optical switches can be largely grouped into three categories: 1) silicon mirrors, 2) fluid switches, and 3) thermal-optical switches. Both fluid and thermal-optical switches have been demonstrated, but these technologies lack the ability to scale up to a high number of channels or port counts. A high port count is important to switch a large number of fibers efficiently at the junctions. Thus far, the use of silicon mirrors in a three dimensional (3D) space is the only approach where a high port count (e.g., greater than 1000) is achievable.

Optical Cross Connects that use 3D silicon mirrors face extreme challenges. These systems require very tight angular control of the beam path and a large free space distance between reflective mirrors in order to create a device with high port counts. The precise angular controls required are typically not achievable without an active control of beam paths. Since each path has to be monitored and steered, the resulting system can be complex and costly. These systems also require substantial software and electrical (processing) power to monitor and control the position of each mirror. Since the mirror can be moved in two directions through an infinite number of possible positions (i.e., analog motion), the resulting feedback acquisition and control system can be very complex, particularly for a switch having large port counts. For example, as described in a recent development report, Lucent Technology's relatively small 3D mirror-switching prototype was accompanied by support equipment that occupied three full-size cabinets of control electronics.

Ideally, an optical switch will have the following principal characteristics:

1) Be scalable to accommodate large port counts (>1000 ports);
2) Be reliable;
3) Be built at a low cost;
4) Have a low switching time;
5) Have a low insertion loss/cross talk.

While the 3D-silicon mirror can meet the scalability requirement, it cannot achieve the rest of the objectives.

Therefore, there is a need for a new approach whereby the complex nature of the 3D free space optical paths and analog control can be replaced with guided optical paths and digital (two states) switching. Such a system will greatly simplify the operation of switching, enhance reliability and performance, while significantly lowering cost. The disclosure in the following sections describes such a system.

SUMMARY OF THE INVENTION

The invention relates to an optical switching system that uses movable optically transmissive microstructures to switch optical signals in three dimensions. This 3D system uses movable microstructures to direct multiple optical paths.

A first, separate aspect of the invention is an optical switching system for switching optical signals in three dimensions by selectively moving movable microstructures having optically transmissive structures, where the optical signals take one set of paths if the microstructures are not moved and if at least one microstructure is moved, the optical signals take a different set of paths depending on the microstructure moved.

A second, separate aspect of the invention is an optical switching system for switching optical signals in three dimensions by selectively moving movable microstructures having optically transmissive waveguides, where the optical signals take one set of paths if the microstructures are not moved and the optical signals take a different set of paths if at least one microstructure is moved.

A third, separate aspect of the invention is an optical switching system for switching optical signals in three dimensions comprising a fixed input waveguide, at least one waveguide network with at least two outputs mounted to a movable microstructure, and a fixed output waveguide.

A fourth, separate aspect of the invention is an optical switching system for switching optical signals in three dimensions comprising movable optically transmissive microstructures, each microstructure having an input and an output, where the input is positioned in close proximity (e.g., a small air gap) to a waveguide containing an incoming optical signal and the output is positioned in close proximity (e.g., a small air gap) to a waveguide for carrying an outgoing optical signal.

A fifth, separate aspect of the invention is an optical switching system for switching optical signals in three dimensions comprising a microstructure mounted for movement relative to the substrate of a silicon chip, the microstructure carrying an optically transmissive waveguide network.

A sixth, separate aspect of the invention is an optical switching system for switching optical signals in three dimensions comprising a substrate of a chip, a microstructure carrying optically transmissive waveguides and being movably mounted to the substrate for movement relative to the substrate, and a control structure for moving the microstructure relative to the substrate.

A seventh, separate aspect of the invention is an optical switching system for switching optical signals in three dimensions comprising a substrate of a chip, a plurality of support structures mounted to the substrate, a plurality of microstructures carrying optically transmissive waveguides and movably mounted to the support structures for movement relative to the substrate, and a control structure for moving the microstructures relative to the substrate.

An eighth, separate aspect of the invention is an optical switching system for switching optical signals in three dimensions comprising an optical switch having a movable optically transmissive microstructure that switches optical signals in the X-Y dimension and an optical switch having a movable optically transmissive microstructure that switches optical signals in the Z dimension, thereby providing the capability to switch optical signals in 3 dimensions.

A ninth, separate aspect of the invention is an optical switching system for switching optical signals in three dimensions comprising a micro-switch element having a movable optically transmissive microstructure, the micro-switch element being capable of directing optical signals from two inputs to any of two outputs.

A tenth, separate aspect of the invention is an optical switching system for switching optical signals in three dimensions comprising a movable optically transmissive microstructure which corrects optical misalignment from a two dimensional array of optical outputs by using a two dimensional array of optic elements placed at the interface.

An eleventh, separate aspect of the invention is a method of switching optical signals in three dimensions comprising the step of selectively moving a first movable optically transmissive microstructure, where the optical signals take one set of paths if the first microstructure is not moved and the optical signals take a different set of paths if the first microstructure is moved, and the step of selectively moving a second movable optically transmissive microstructure, where the optical signals take one set of paths if the second microstructure is not moved and the optical signals take a different set of paths if the second microstructure is moved.

A twelfth, separate aspect of the invention is a method of switching optical signals in three dimensions comprising the steps of providing an incoming optical signal through a fixed input waveguide, selectively directing the optical signal into one of at least two waveguides mounted to a first movable microstructure by selectively moving the first microstructure, outputting the optical signal through a fixed output waveguide, and selectively directing the optical signal into one of at least two waveguides mounted to a second movable microstructure by selectively moving the second microstructure.

A thirteenth, separate aspect of the invention is a method of switching optical signals in three dimensions comprising the step of positioning a movable optically transmissive microstructure having an input and an output such that the input is positioned in close proximity (e.g., a small air gap) to a waveguide containing an incoming optical signal and the output is positioned in close proximity (e.g., a small air gap) to a waveguide for carrying an outgoing optical signal.

A fourteenth, separate aspect of the invention is a method of switching optical signals in three dimensions comprising the step of mounting an optically transmissive microstructure for movement relative to the substrate of a silicon chip, the microstructure carrying an optically transmissive waveguide network.

A fifteenth, separate aspect of the invention is a method of switching optical signals in three dimensions comprising the steps of providing a substrate of a chip, movably mounting a microstructure carrying optically transmissive waveguides to the substrate for movement relative to the substrate, and selectively moving the microstructure relative to the substrate to switch the optical signals.

A sixteenth, separate aspect of the invention is a method of switching optical signals in three dimensions comprising the steps of providing a support structure mounted to the substrate of a chip, movably mounting a microstructure carrying an optically transmissive waveguide network to the support structure for movement relative to the substrate, and selectively moving the microstructure relative to the substrate to switch the optical signals.

A seventeenth, separate aspect of the invention is a method of switching optical signals in three dimensions comprising the steps of providing an optical switch that switches optical signals in the X-Y dimension and providing an optical switch that switches optical signals in the Z dimension, thereby providing the capability to switch optical signals in 3 dimensions.

An eighteenth, separate aspect of the invention is a method of switching optical signals in three dimensions comprising the steps of providing a micro-switch element having a movable optically transmissive microstructure capable of directing optical signals from two inputs to any of two outputs.

A nineteenth, separate aspect of the invention is a method of switching optical signals in three dimensions comprising the steps of selectively moving an optically transmissive microstructure to switch optical signals and correcting optical misalignment from a two dimensional array of optical outputs by using a two dimensional array of optic elements placed at the interface.

A twentieth, separate aspect of the invention is a method of fabricating movable and stationary waveguides for use with a movable optically transmissive microstructure.

A twenty-first, separate aspect of the invention is a method of fabricating movable and stationary waveguides for use with a movable optically transmissive microstructure, the method comprising the steps of integrating simple switch elements and forming a structure capable of simultaneously switching a high density of optical signals from a two dimensional input array to a two dimensional output array.

A twenty-second, separate aspect of the invention is any of the above separate aspects, either individually or in some combination.

Further separate aspects of the invention can also be found in a system or method that practices any of the above separate aspects, either individually or in some combination.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. Moreover, in the figures, like reference numerals designate corresponding parts throughout the different views.

FIG. 3A illustrates a plan view of an example embodiment of a single switching layer of FIG. 2.

FIG. 3B illustrates an edge view of an example embodiment of a single switching layer of FIG. 2.

DETAILED DESCRIPTION OF THE PREFERRED EMBODIMENT

Figure 1:
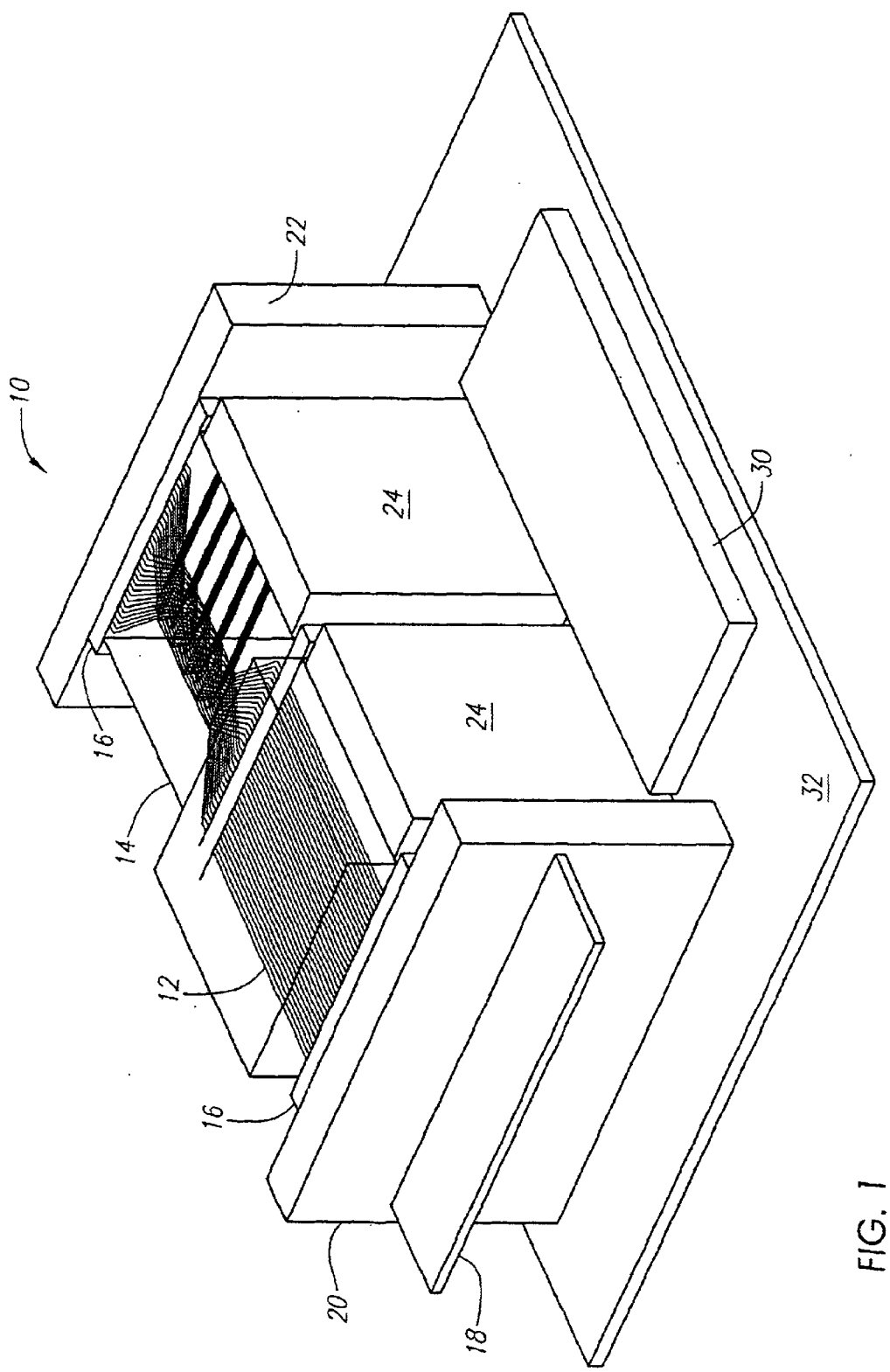
FIG. 1 illustrates a block diagram of an example embodiment of an optical switch system adapted to handle 1024 ports.

FIG. 1 illustrates a block diagram of an example embodiment of an optical switch system 10 adapted to handle 1024 ports by 1024 ports. This optical switch system 10 includes a 3-dimensional waveguide. The 3D optical switch system 10 shown in FIG. 1 employs guided wave paths (i.e., waveguide), digital switching, and is capable of handling 1024 ports. Two of the key components of the optical switch system 10 are two OXC blocks 12, 14. OXC blocks 12, 14 are also referred to as switch blocks because they include vertical and horizontal optical switches respectively. OXC block (Y) 12 is used for switching optical beams in the vertical direction, and OXC block (X) 14 switches optical beams in the horizontal direction. The two OXC blocks (Y and X) 12, 14 are connected end-to-end such that all outputs of the first (Y) OXC block 12 is connected to the input of the second (X) OXC block 14.

Since each OXC block 12, 14 is an assembled unit, some manufacturing tolerances may be inevitable. To handle the accumulation of these tolerances, an optical connector 16 is required to facilitate system assembly. Likewise, optical connectors 16 may be used at the input of the first OXC block 12, and output of the second OXC block 14, to allow for positional errors at the interface connection. Optionally, the optical connector 16 can be an optical-to-electrical-to-optical connector, a plurality of mirrors in free space, a bundle of optical fibers, or any kind of optical connector.

Optical fibers 18 are connected to the input interface 20. The switched optical signals exit at the output interface 22. For example, the input interface 20 and output interface 22 may be mechanical interfaces to fiber optics. Electrical signals for controlling individual switch elements are interconnected (between layers) in an electrical interconnect 24 on the side of each OXC block 12, 14. These electrical wires are routed to the Interface and Control Electronics 30 located adjacent to the OXC blocks 12, 14. The optical switch system 10 may be mounted on a board 32.

Figure 2:
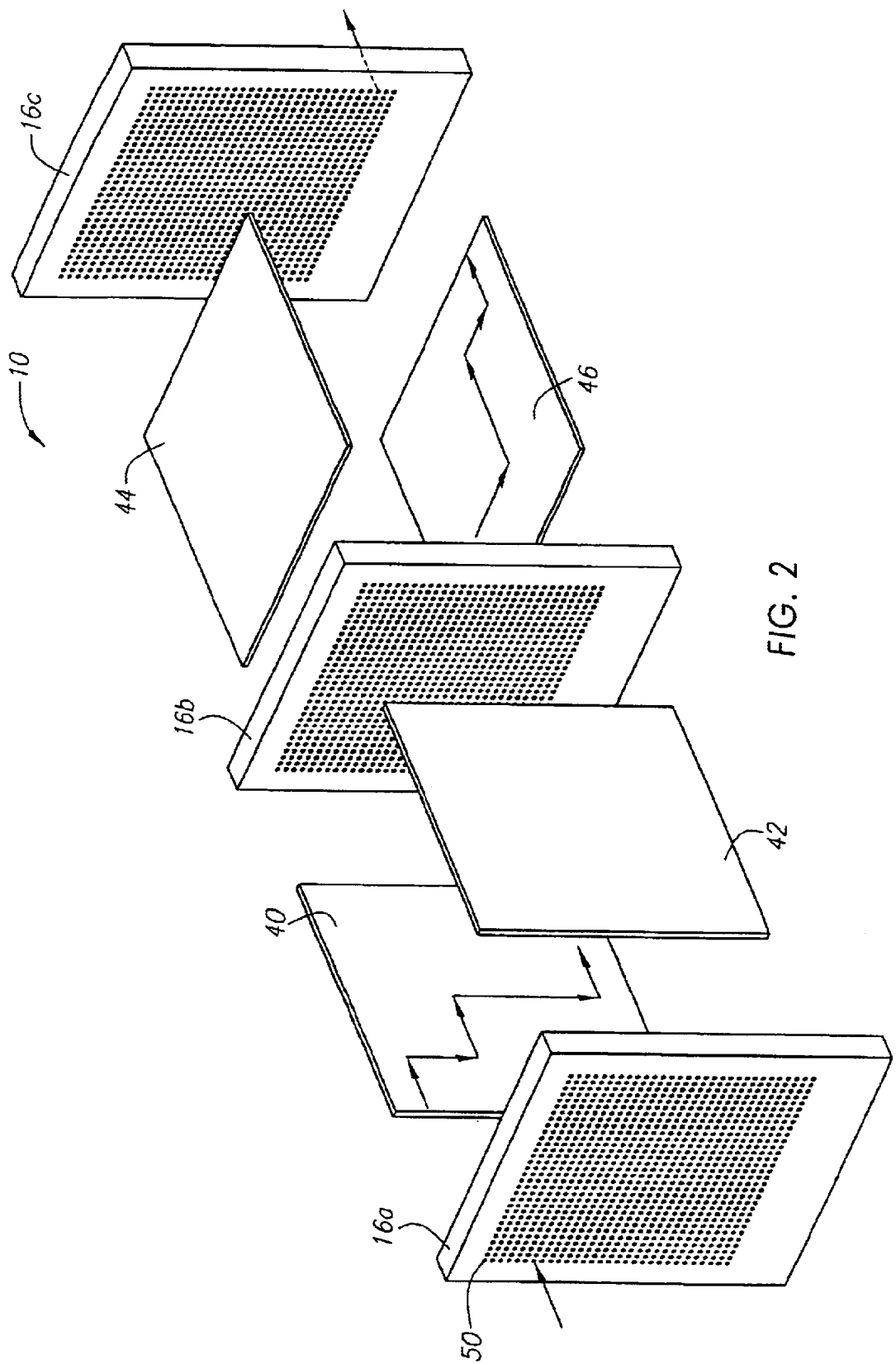
FIG. 2 illustrates an exploded conceptual view of an example embodiment of the OXC blocks and optical connectors of FIG. 1.

FIG. 2 illustrates an exploded conceptual view of an example embodiment of the OXC blocks 12, 14 and optical connectors 16A–16C of FIG. 1. For clarity, the vertical switch block, OXC block 12, is shown with only the first and last switching layers 40, 42. Each switching layer 40, 42, for example, is capable of switching 32 inputs to any of the 32 outputs in the vertical direction. By placing 32 of the switching layers together, all 32 channels can be connected along the vertical plane. To complete the full capability of switching 32×32 channels, a mechanism for switching in the horizontal direction is needed and this is fulfilled, for example, by a second OXC block 14 (the horizontal switch block). FIG. 2 shows only the first and last switching layers 44, 46 of the second (X) OXC block 14. Each switching layer 44, 46, for example, is capable of switching 32 inputs to any of the 32 outputs in the horizontal direction. By placing 32 of the switching layers together, all 32 channels can be connected along the horizontal plane. Combined into the embodiment shown in FIG. 2, the vertical and horizontal switching layers create a 32×32 optical switch.

The following example illustrates how a signal at channel (1,1) (the numbers refer to the row and column number respectively) can be routed to the channel (32,32) output. The optical beam 50 (represented in arrows) enters at the (1,1) location, through first optical connector 16A, and enters the first switching layer 40. The switches in the first switching layer 40 connect the optical beam from (1,1) to the (1,32) output. The optical signal exits the vertical (Y) switch layers, and passes and realigns properly through the second optical connector 16B into the horizontal (X) switching layer at (1,32). The optical beam now is routed from position (1,32) to position (32,32), then realigns and exits through the third optical connector 16C.

The optical switch system 10 may have an optical path network 202. The optical path network 202 includes at least one optical path along which the optical signal 50 may travel. For example, the optical path network 202 may include a mirror, waveguide, air gap, or other structures that provide an optical path. In the example embodiment, the optical path network 202 is a waveguide network 202. One advantage of the 3D waveguide embodied in the optical switch system 10 described is that in this approach it is possible to achieve a large port count without a need to control the beam paths precisely and actively. Since the optical beam is captured within the waveguides or waveguide networks on each switching layer, only the end connections are critical. A waveguide network may include a plurality of waveguides such as waveguide network 202 shown in FIG. 8A. In fact, a waveguide network may contain only a single waveguide, if desired. Where an embodiment is described as using a waveguide network, it should be understood that the embodiment could use a waveguide instead, and vice versa. Where alignment is critical, such as at the interface, an optical connector 16 will allow for correction of beam misalignment using conventional and inexpensive optics. The simplicity of the resulting 3D waveguide and the protective environment (e.g., each switching layer can be sealed) further enhances the reliability and robustness of the system, providing beam paths which are unaffected by temperature, humidity, aging and handling.

FIGS. 3A and 3B illustrate a plan view and an edge view respectively of an example embodiment of a single switching layer of FIG. 2, for example, switching layer 44. This example shows how 32 inputs can be connected through an array of simple switch elements 60, to 32 outputs. In this example of a 32×32 port, there are 80 switch elements 60. The methodology of interconnection is well known to those skilled in the art of signal routing design and may be any methodology. Pioneering work in routing theories done at Bell Laboratories has shown that an optical signal can be efficiently routed by connecting simple switches (such as 2×2 elements) in a specific manner. By following these routing guidelines, it can be shown that every input can be connected to any output without any of the connections blocked.

The switching layer 44 shown in FIGS. 3A, 3B includes a substrate 62 that carries waveguides 64 and switch elements 60. In this example embodiment, the substrate 62 may be any semiconductor material such as silicon. To protect these waveguide and switch element microstructures, the substrate 62 may be covered and sealed by using another (cap) wafer 63. An effective sealing to exclude contaminants and humidity can be achieved by bonding a cap wafer 63 to substrate 62 using any of a multitude of techniques already available, including anodic, fusion, and eutectic bonding.

Optical signals 50 enter the switching layer 44 at one edge. Preferably, the edge is polished and angled to allow a complete refraction of the optical beams 50. Depending on the optical index of the interface medium (e.g., air or another optical element), the angle of the edge can be designed to accommodate total refraction. Once the optical beam 50 enters the waveguide 64, light cannot escape from the waveguide 64 due to a phenomenon known as total internal reflection. This is the same phenomenon that allows an optical fiber to carry light for long distances without significant loss.

The switching action is controlled by the application of electrical voltage. Each switch element 60 requires, for example, three electrical connections: an actuation electrode, a position sensing electrode, and electrical ground. The electrical ground connection can be tied together to minimize the number of electrical traces. Each switch element 60 would have, therefore, a minimum of two electrical connections that need to be passed through and underneath the capping wafer 63 to interface with the outside world. In FIG. 3A, the electrical traces 66 are shown traversing substantially orthogonally to the optical path and terminating at the electrical bond pads 68 at the lower edge. Of course, the actual layout of the electrical traces 66, bond pads 68, input ports and output ports can be modified to be different than that shown in this example.

Figure 4A:
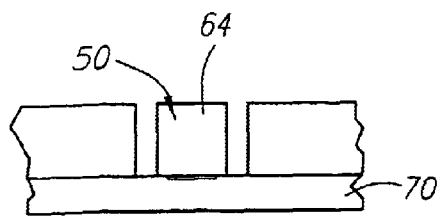
FIGS. 4A–4F illustrate different example embodiments of a waveguide on a switching layer.
Figure 4B:
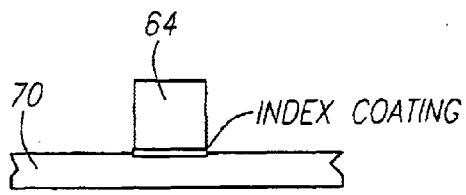

FIGS. 4A–4F illustrates various example embodiments of a waveguide 64 on a switching layer. To maintain total internal reflection (TIR), the environment surrounding the waveguide 64 must have an optical index of refraction lower than index of the waveguide 64. Glass, for example, which has an index of 1.5, can be coated with a material having a lower index, or simply use a vacuum (index 1.0) or air as the medium. A wide range of gases could be used to ensure compatibility with the wafer bonding process. In a first embodiment, FIG. 4A illustrates a cross section of a waveguide 64 formed of glass whereby the medium surrounding the waveguide 64 is in a vacuum or air. The carrier 70 may be formed of glass or silicon. In a second embodiment, FIG. 4B illustrates another waveguide 64 where the top and sides of the waveguide 64 are in contact with a vacuum while the bottom surface is bonded with an intermediate material with an index lower than that of the waveguide. The carrier 70 may be formed of glass or silicon.

In both of the FIGS. 4A and 4B embodiments, the upper substrate should be a material that will transmit optical signals at the wavelength of interest, such as 0.82, 1.3, and 1.55 micrometers. These are the wavelengths that are typically used in fiber optics transmission, and in which the support equipment (such as the transmitter, carrier and receiver) is designed to handle. In both embodiments, the material on the bottom (carrier substrate 70) is used mainly to provide mechanical support to the structure. As it will be explained later, the actual switching mechanism will require some of the waveguides to move vertically or laterally by the application of an external force. The carrier substrate 70 can be made of glass, silicon, or any material compatible with micromachining.

Figure 4C:
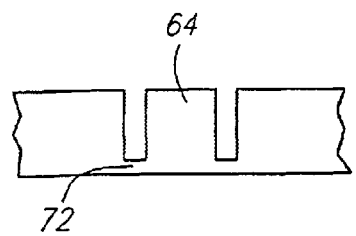
Figure 4D:
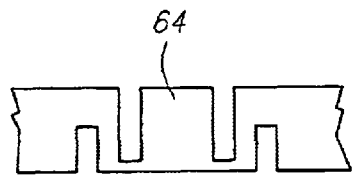

FIGS. 4C and 4D illustrate alternative embodiments of a waveguide 64 without using a substrate 70. The small amount of material 72 that bridges the waveguide 64 to adjacent material will allow some loss of light and this design needs to consider the tradeoff between mechanical strength and optical loss. One advantage of the embodiments in FIGS. 4C and 4D is that only a single-layer structure is required, avoiding the necessity of wafer bonding. Detailed designs using these alternative embodiments should involve achieving a balance between the mechanical and optical integrity of the waveguides and acceptable manufacturing costs.

Figure 4E:
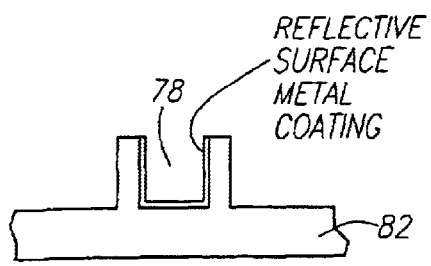

Although the preferred embodiment of an optical switch system uses a waveguide, optical guides using reflective surfaces or other known structures can also be used. FIG. 4E shows a guide 78 made by bonding two wafers 80, 82 to create a closed optical guide 78. To enhance the reflectivity of the surface, metal coating such as gold or nickel (or any other materials compatible with the micromachining process) could be deposited on the inner surfaces prior to bonding.

Figure 4F:
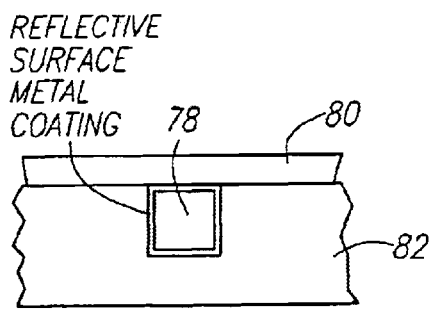

Yet another alternative embodiment is to use the vertical surfaces of the microstructure. As in a conventional optical system, such an approach would require tight angular control of the vertical walls to control the beams precisely. FIG. 4F shows a trench etched into the wafer whose vertical walls are the reflective surfaces with a top cap 80 forming a closed waveguide 78. As before, a metal coating can be applied to enhance reflectivity.

Figures 5A, 5B:
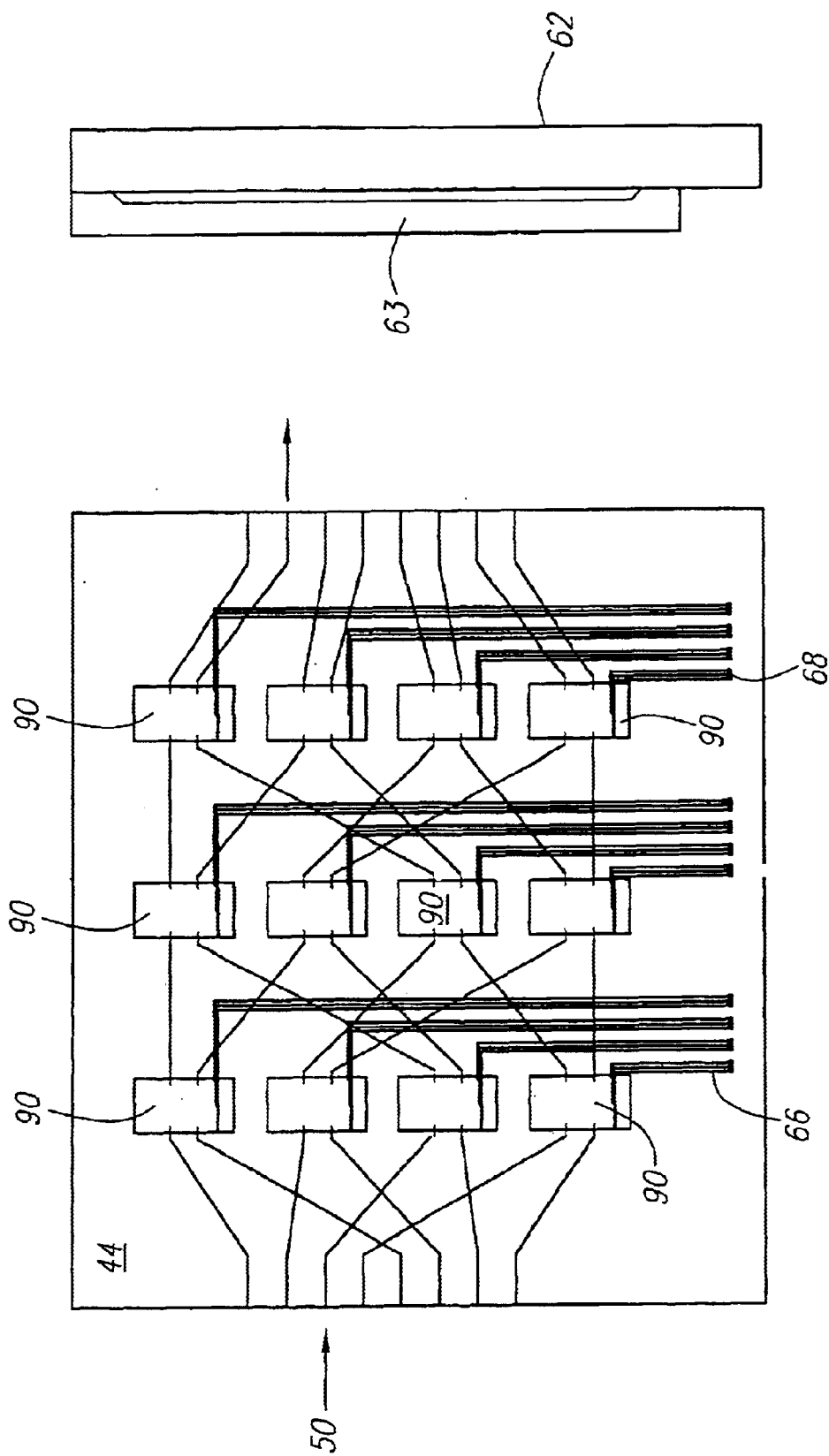
FIG. 5A illustrates an plan view of an example embodiment of a switching layer which can switch 8×8 ports.
FIG. 5B illustrates an edge view of the switching layer of FIG. 5A.

FIGS. 5A and 5B illustrate a plan view and an edge view of an example embodiment of a non-blocking switching layer 44 that performs switching of 8×8 ports. To achieve full switching capability in this example, 12 switch elements 90 are required. Each switching element 90 is capable of performing a 2×2 switch. The switching layer 44 is non-blocking because the optical signal 50 always passes to the optical output side through some optical path.

Optical connectors 16 are used to minimize insertion loss due to misalignment between the optical fiber and the switch element 90, or between OXC blocks. In both cases, there is an accumulation of geometrical tolerances due to imperfect assembly, which should be corrected to minimize loss of light. Most often, the misalignment is due to a combination of linear and angular offsets.

Figure 6B:
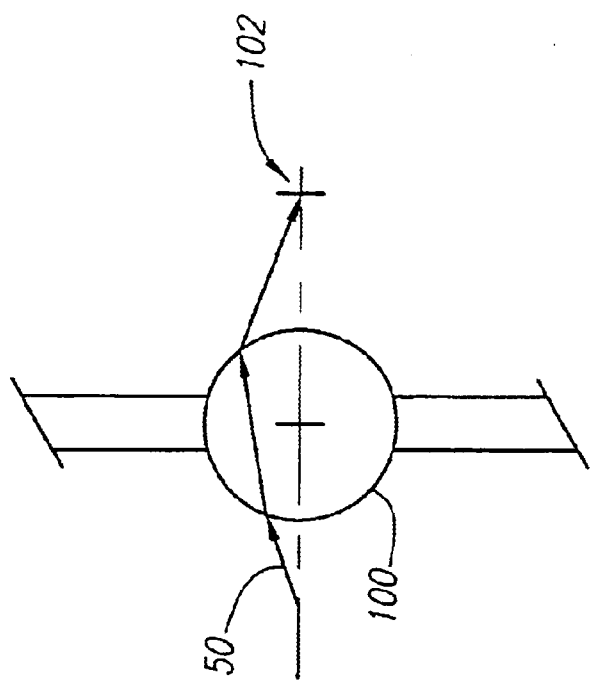
FIG. 6B illustrates how the optical connector of FIG. 6A corrects a misaligned light beam.
Figure 6A:
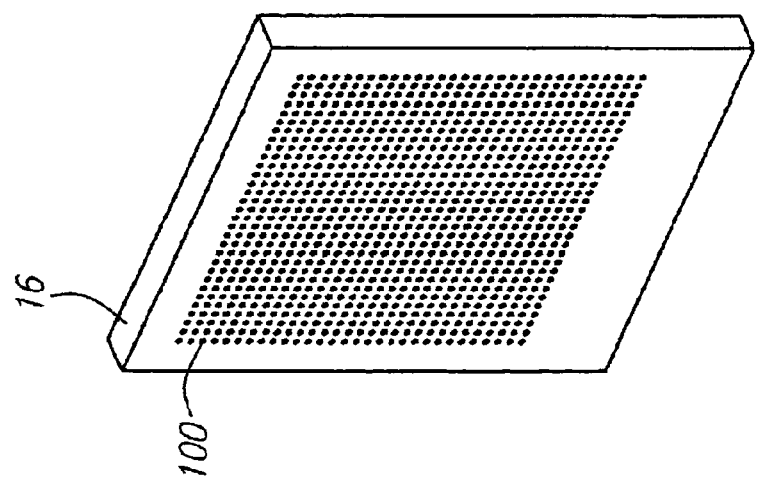
FIG. 6A illustrates an example embodiment of an optical connector whose optical substrate is machined to have an array of convex spherical surfaces.

FIG. 6A illustrates an optical connector 16 whose substrate is machined on both sides to have an array of convex spherical surfaces 100. One side of the spherical surface array is positioned to connect with a fiber bundle to receive the incoming light beam 50. The opposite convex surface focuses the beam onto a small spot to allow for connection to the OXC blocks. For example, the optical connector 16 may have as a spherical surface 100 for each port in the optical switching system (here, e.g., 32×32, or 1024 surfaces 100).

FIG. 6B illustrates how the optical connector of FIG. 6A corrects a misaligned beam of light. Let us presume a light beam 50 entering on the left that will normally be out of the range of the entrance to the OXC block or other optical passage. If uncorrected, the light beam 50 will not properly enter the entrance to the OXC block. However, the misaligned beam 50, after being corrected by a spherical surface of the optical connector 16 will emerge from the optical connector 16 focused on an image point 102. By placing the entrance pupil of the OXC block or optical fiber entrance at or near the image point 102, the emerging light beam will be approximately centered and will enter the optical passage such as a waveguide 64 at an incident angle that will be captured by a total internal reflection process. Other type of surfaces other than spherical can also be used to enhance the quality of the emerged beam. The detailed design of the optical surfaces and selection of the optical material can include those known to those skilled in the art of optical design.

The optical connector 16 which uses convex spherical surfaces 100 can be manufactured using a series of spherical balls and securing those balls in a plate with precisely machined holes. To hold the balls in place, the simplest method is to shrink the balls in a cold bath (e.g., liquid nitrogen) and inserting the balls into the holes of the plate. Proper methods of fixture will allow a large number of balls to be inserted simultaneously and precisely. Alternatively, specialized tooling with convex grinding tool bits can be made to produce the desired surfaces. The possible manufacturing techniques are numerous and include those well known to those skilled in the art of optical manufacturing.

Figure 7D:
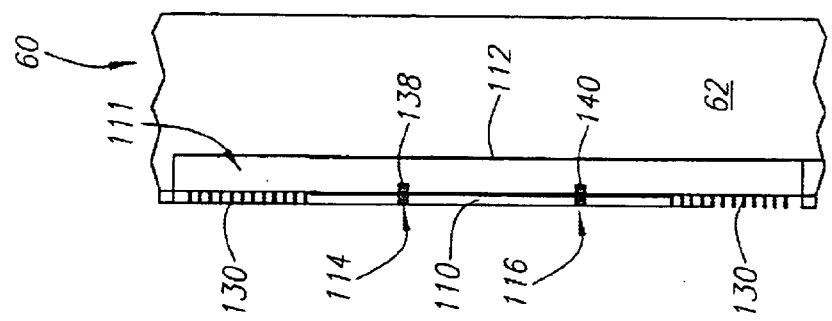
FIG. 7D illustrates an example embodiment of a switch element having a movable optically transmissive platform and a double layer of waveguides.
Figure 7C:
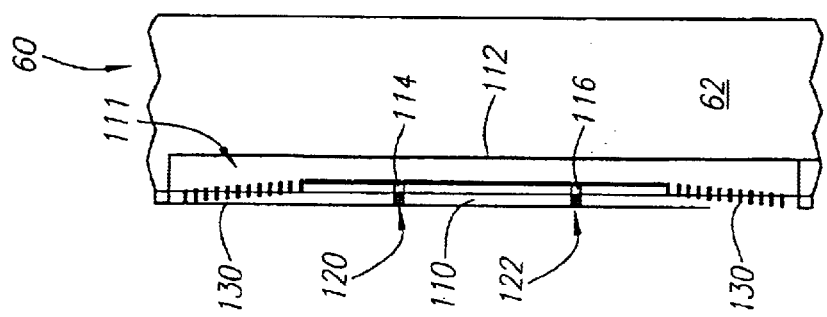
FIG. 7C illustrates the switch element of FIG. 7A when the movable platform is moved.
Figure 7B:
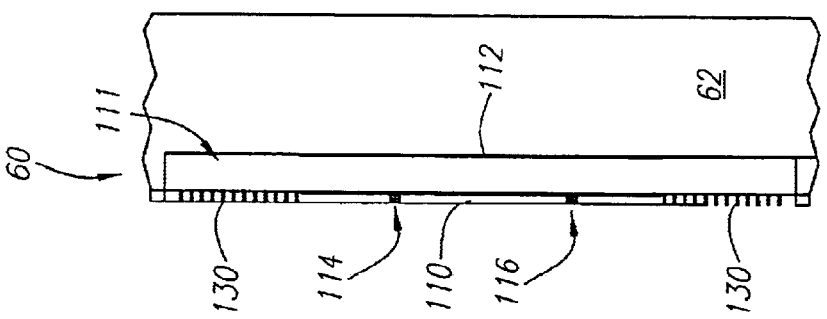
FIG. 7B illustrates the switch element of FIG. 7A when the movable platform is not moved.
Figure 7A:
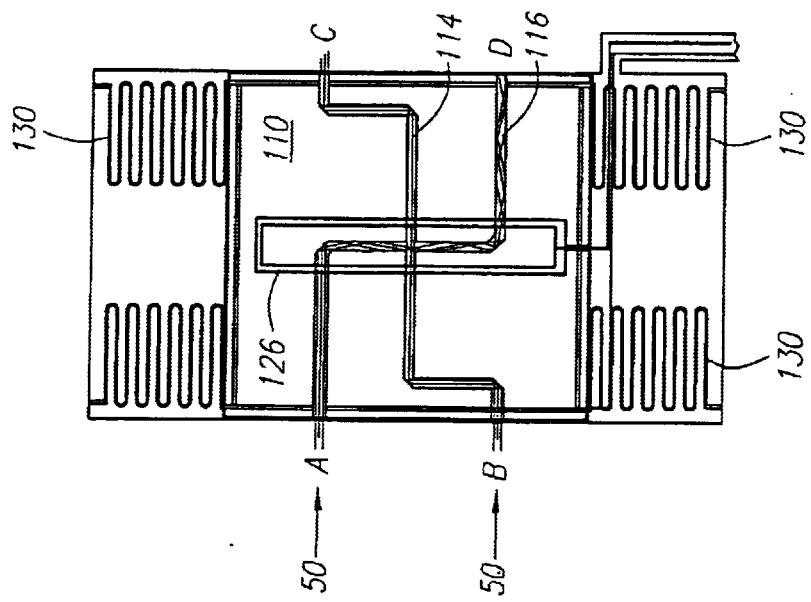
FIG. 7A illustrates an example embodiment of a switch element having a movable optically transmissive platform.

FIG. 7A illustrates an example embodiment of a small switch element 60 made by a micromachining process. This example embodiment is of a 2×2 switch element 60 because there are two inputs and two outputs; of course, the number of inputs and the number of outputs can be increased or decreased. The embodiment of the switch element 60 has two waveguides integrated on top of a carrier platform 110. The combined structure (waveguide and carrier) is bonded to a substrate 62 and positioned such that the switch element 60 is suspended over an air gap over, or a cavity 111 previously etched on, the substrate 62. The carrier platform 110 is preferably suspended approximately 30 microns above the actuation electrodes 112. The waveguides 114, 116 are typically less than 10 microns and in this example, the small channel size is necessary to ensure transmission of only single-mode optical signals. The size of the structure and the design of the support springs 130 depend on the type of actuation mechanism used. The embodiment will use electrostatic attraction as the means of actuation.

For electrostatic actuation, both the carrier platform 110 and the stationary electrodes 112, 126 have to be electrically conductive, thereby causing the carrier 110 to move toward the electrodes 112, 126, as illustrated in FIGS. 7B and 7C. If the carrier platform 110 is made out of dielectric materials, it can be made conductive by coating the bottom (i.e., the surface facing the stationary actuation electrode 112) with a metal such as gold or nickel. If the carrier platform 110 is made of semiconductor materials such as silicon, it can be doped to increase electrical conductivity. Opposing and parallel to the carrier platform 110 are the stationary electrodes 112, 126 patterned on the bottom of the cavity 111. These electrodes 112, 126 connect to the top of the substrate 62 by traces patterned on the sloped surfaces. In the cavity 111, two stationary electrodes 112, 126 are made, one electrode 112 for actuating movement of the carrier platform 110 and the other electrode 126 for feedback sensing of the position of the carrier platform 110.

This example embodiment of the switch element 60 operates as follows. Optical signals 50 enter on the left of the switch element 60 at locations A and B. The optical signals 50 enter the waveguides 114, 116 and cross over due to the particular configuration of the waveguides in this embodiment. The optical signals 50 from locations A and B exit the switch element 60 at locations D and C respectively. The original optical signals 50 have crossed from A to D and from B to C. When no crossing of the optical signals 50 is desired in this particular embodiment, an electrical signal is required from the control hardware. By applying a voltage to the fixed electrodes 112 on the substrate 62 and a different voltage to the electrode of the carrier platform 110, the voltage difference will result in an electrostatic attraction force. Such a force will pull the carrier platform 110 (and the waveguides 114, 116 carried by the carrier platform 110) down (here, less than 10 micrometers) toward the fixed electrodes 112, 126 by bending the support springs 130, and therefore, in the process remove the waveguides 114, 116 from the optical path. The optical signals 50 from location A then pass directly (through free space 120) toward point C, and the optical signals 50 from location B pass directly (through free space 122) to location D. FIG. 7B illustrates the case where the carrier platform 110 is in its rest state because no power is applied to the actuation electrode 112; here, the optical signals 50 from locations A and B of the fixed waveguides at the input side of the carrier platform 110 cross over in movable waveguides 114, 116 to locations D and C, respectively, of the fixed waveguides at the output side of the carrier platform 110; waveguides 114, 116 are considered "movable" because they move with the movement of the carrier platform 110. When power is applied to the actuation electrode 112, FIG. 7C illustrates the resulting configuration where the carrier platform 110 has moved toward actuation electrode 112; here, the optical signals 50 from locations A and B of the fixed waveguides at the input side of the carrier platform 110 pass directly through free space to locations C and D, respectively, of the fixed waveguides at the output side of the carrier platform 110 because movable waveguides 114, 116 have moved out of range of the optical signals 50.

Other methods of actuation are also viable. Electrostatic actuation is preferred because of the simplicity in design and operation. The main drawback is the higher voltage required to operate the resulting device, due to the large gap, typically ranging from 20 to 100 volts. Alternative actuation methods include magnetic and thermal techniques. These methods are well known to those skilled in the art of micromachine design.

The sensing electrode 126 on the substrate 62 is used to detect the position of the carrier platform 110 by sensing changes in capacitance between the electrode 126 and the electrode of the carrier platform 110 due to changes in the gap caused by movement of the carrier platform 110. Other means of sensing, such as piezo-resistive, magnetic, optical schemes are also viable. The signal from the sensing electrode 126 is used (through close-loop control) to accurately position the waveguides 114, 116 over the optical entrance and exit.

The primary loss of optical signal will be at the entrance of the movable waveguides 114, 116 (on the carrier platform 110 of the switch element 60) and at the entrance of the fixed waveguides. Reducing the distance between the locations A/C and between B/D can minimize such loss. To fully minimize loss, but with increased manufacturing complexity, a secondary waveguide 138, 140 can be designed on the bottom of the carrier platform 110. In that case, the opening between the stationary waveguides and the movable waveguides 114, 116 can be reduced to less than 2 microns, depending on the etching process. FIG. 7D illustrates a carrier platform 110 with waveguides 114, 116 on top and waveguides 138, 140 on the bottom, with one set designed for straight pass and the other for crossover. As is apparent from the embodiment shown in FIG. 7D, in the case where the carrier platform 110 is in its rest state because no power is applied to the actuation electrode 112, the optical signals 50 from locations A and B of the fixed waveguides at the input side of the carrier platform 110 pass through movable waveguides 138, 140 to the fixed waveguides at the output side of the carrier platform 110. Likewise, when power is applied to the actuation electrode 112, the carrier platform 110 moves toward actuation electrode 112 so the optical signals 50 from locations A and B of the fixed waveguides at the input side of the carrier platform 110 now pass through waveguides 114, 116 of the fixed waveguides at the output side of the carrier platform 110 because movable waveguides 138, 140 have moved out of range of the optical signals 50 and movable waveguides 114, 116 have moved into range of the optical signals 50. Of course, in an embodiment which uses double movable waveguides, such as that illustrated in FIG. 7D, the default can be either straight pass or crossover. In other words, waveguides 114, 116 can permit a straight pass while waveguides 138, 140 causes a cross over, or vice versa.

Figure 8A:
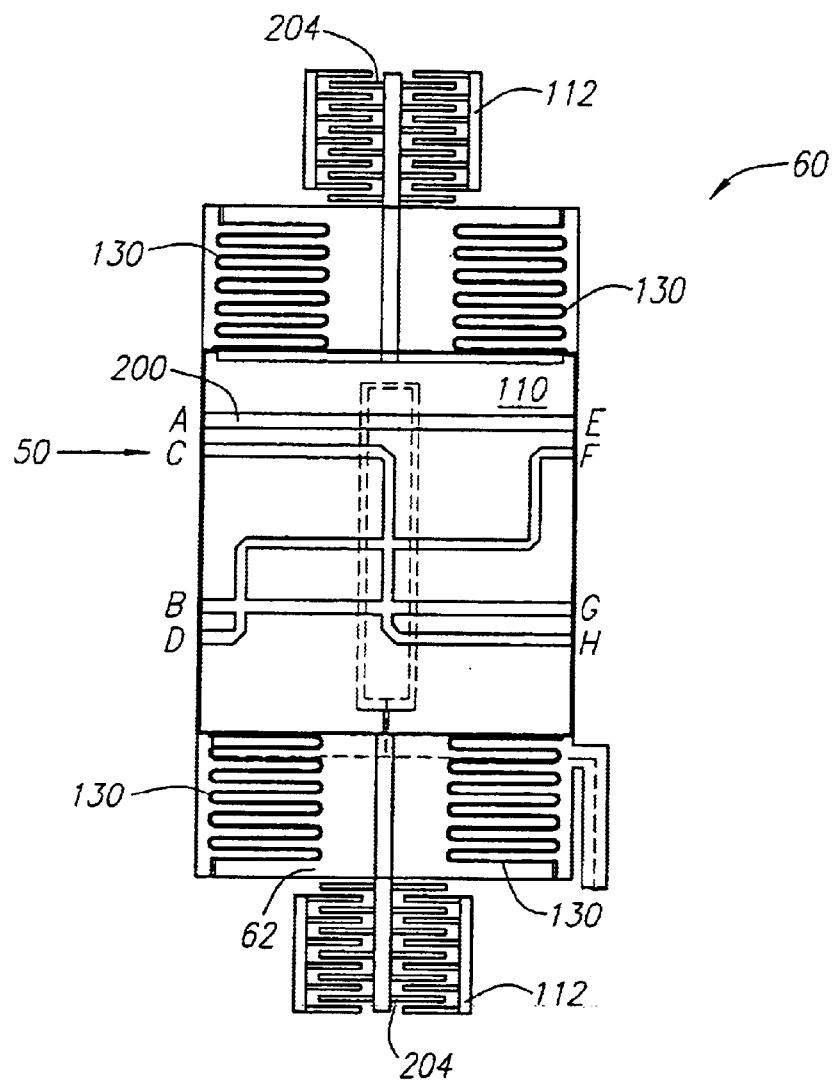
FIG. 8A illustrates an example alternative embodiment of a switch element having a movable optically transmissive platform which moves parallel to the plane of the substrate.
Figure 8B:
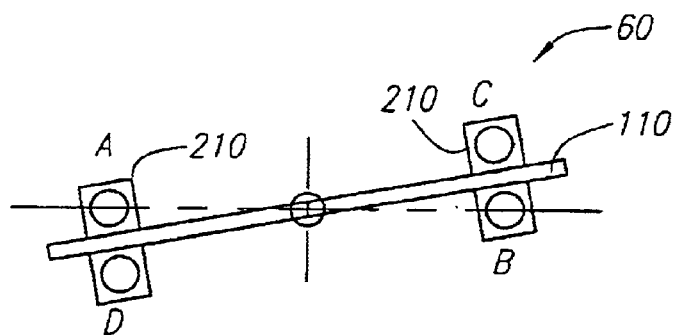
FIG. 8B illustrates an example alternative embodiment of a switch element having a rotatable or pivoting optically transmissive platform.

An alternative embodiment of a MEMS switch element 60 is now described. The movement of the switch element 60 is not limited to those in the vertical direction perpendicular to the substrate 62. FIG. 8A illustrates an example alternative embodiment of a MEMS switch element whereby the actuation direction is lateral or substantially parallel to the plane of substrate 62. FIG. 8B illustrates an example alternative embodiment of a MEMS switch element which relies on rotational movement. Of course, an optical switching system 10 may be created from optical switch elements which all move in the same manner (e.g., all move vertically, all move laterally, or all move rotationally) or optical switch elements which move in different manners (e.g., some move vertically and others move laterally, or some move vertically and others move rotationally, or some move laterally and others move rotationally). The lateral movement can be induced by applying different voltages to the inter-digitated (known as comb fingers in MEMS) structures as shown in FIG. 8A. Describing what is illustrated in FIG. 8A, the MEMS switch element 60 comprises a substrate 62. Suspended above substrate 62, for example over a cavity or otherwise, is a movable optically transmissive platform 110. Platform 110 is stated to be "optically transmissive" because it has structures (e.g., waveguide networks 200, 202) which transmits optical signals or light beams 50; it is not intended to mean that the entire platform itself must be optically transmissive. One side of the platform 110 is coupled to support springs 130 and the opposite ends of the support springs 130 are coupled or anchored to the substrate 62. The platform 110 has electrodes 204. In this example, electrodes 204 are inter-digitated with actuation electrodes 112. By applying different voltages to the electrodes 204 and actuation electrodes 112 on one side of the platform 110 as compared to the other side of the platform 110, the platform 110 moves in a lateral, or substantially parallel, manner relative to the plane of the substrate 62. In FIG. 8A, this lateral movement means that the platform 110 moves up or down.

The platform 110 carries waveguide networks 200, 202 where the optical paths from the input side of optical signals 50 to the output side change depending on the lateral position of the platform 110. For example, if the platform is in a first position (e.g., a rest position), the alignment of the incoming optical signals 50 to the inputs A, B, C and D of the waveguide networks 200, 202 is selected such that optical signals 50 enter inputs C and D. Because of the particular configuration of this example of the waveguide networks 200, 202, optical signals 50 which enter inputs C and D of the waveguide networks 200, 202 cross over and exit at outputs H and F respectively. If the platform 110 is then moved to its second position, incoming optical signals 50 would enter inputs A and B, and pass straight through to outputs E and G respectively. Of course, the waveguide networks 200, 202 can be swapped so that the default is a straight pass through. The waveguide networks may be configured in any shape or form to accomplish whatever optical paths are desired.

The lateral movement approach as shown in FIG. 8A has the advantage of not requiring the bottom electrodes, thus reducing several steps in the manufacturing process. The disadvantage is that the amount of electrode area is limited due to the short height of the resulting structure, and as a result, a large number of comb fingers may be required to generate a sufficient attraction force. A significantly larger electrode area may be required to operate the laterally-moving switch element of FIG. 8A than the vertically-moving switch element of FIG. 7A.

Turning to FIG. 8B, the movable optically transmissive platform 110 moves in a rotational or pivoting fashion relative to the substrate. To accomplish rotational movement in a switch element 60, the same electrostatic attraction forces as used in the preferred embodiments will work. For sensing the position of the platform 110, similar capacitance detection techniques described in the preferred embodiments will apply. As illustrated, this example embodiment of a rotating platform 110 causes inputs A and B to align with the optical signals when the platform 110 is in a first position. When the platform 110 rotates to its second position, inputs C and D are now aligned with the optical signals. As with all of the embodiments, the waveguides and waveguide networks may be configured in any desired shape to achieve the desired optical paths.

While various embodiments of the application have been described, it will be apparent to those of ordinary skill in the art that many more embodiments and implementations are possible that are within the scope of the subject invention. For example, each feature of one embodiment can be mixed and matched with other features shown in other embodiments. Features known to those of ordinary skill in the art of optics may similarly be incorporated as desired. Additionally and obviously, features may be added or subtracted as desired and thus, a movable platform having more than two sets of optical paths is also contemplated, whereby the platform moves to any one of three or more positions such that each position activates a different set of optical paths. As another example, the optical switch may accept more than 2 inputs and provide more than 2 outputs. The optical switch may be combined so as to create bigger optical switches with more ports, as desired. Accordingly, the invention is not to be restricted except in light of the attached claims and their equivalents.

What is claimed is:

1. An optical switch system comprising:
   a first plurality of optical switching sub-systems capable of switching optical signals from a plurality of input ports to a plurality of output signals in a first direction;
   a second plurality of optical switching sub-systems capable of switching optical signals from a plurality of input ports to a plurality of output signals in a second direction not the same as the first direction; and
   an optical connector coupling the first and second plurality of optical switch sub-systems, wherein each of the first and second plurality of optical switching sub-systems comprises:
   (a) an optical switch element including:
      (1) a substrate;
      (2) a platform adapted to move relative to the substrate;
      (3) an actuation mechanism to cause the platform to move from a first position to a second position relative to the substrate; and
      (4) a movable waveguide network having a first input and a second input, the waveguide network coupled to the platform such that the waveguide network moves with the platform, whereby when the platform is in the first position, the optical signal enters the first input and travels along the first optical path in the waveguide network, and when the platform is in the second position, the optical signal eaters the second input and travels along the second optical path in the waveguide network;
   (b) a plurality of optical switch elements having inputs and outputs;
   (c) a plurality of station input waveguide networks coupled to inputs of the plurality of optical switch elements, the stationary waveguide networks transmitting optical signals to the optical switch elements; and
   (d) a plurality of stationary output waveguide networks coupled to outputs of the plurality of optical switch elements, the stationary waveguide networks receiving optical signals from the optical switch elements.

2. The optical switching system of claim 1 further comprising:
   a first plurality of optical switch layers configured to switch optical signals in a first direction;
   a second plurality of optical switch layers configured to switch optical signals in a second direction not the same as the first direction; and
   the optical connector coupling the first and second plurality of optical switch layers.

3. The optical switching system of claim 2 further comprising an input optical connector positioned at the inputs to the first plurality of optical switch layers.

4. The optical switching system of claim 2 further comprising an output optical connector positioned at the outputs of the second plurality of optical switch layers.

5. The optical switching system of claim 2 wherein the optical connector includes alignment correction surfaces that correct alignment trajectory errors in optical signals.

6. The optical switching system of claim 5 wherein the alignment correction surfaces are spherical.

7. The optical switching system of claim 3 wherein the input optical connector includes alignment correction surfaces that correct alignment trajectory errors in optical signals.

8. The optical switching system of claim 7 wherein the alignment correction surfaces are spherical.

9. The optical switching system of claim 3 wherein the output optical connector includes alignment correction surfaces that correct alignment trajectory errors in optical signals.

10. The optical switching system of claim 9 wherein the alignment correction surfaces are spherical.

11. The optical switching system of claim 1 wherein the platform is adapted to move vertically relative to the substrate.

12. The optical switching system of claim 1 wherein the platform is adapted to move laterally relative to the substrate.

13. The optical switching system of claim 1 wherein the platform is adapted to move rotationally relative to the substrate.

14. The optical switching system of claim 1 wherein the waveguide network includes a plurality of waveguides.

15. The optical switching system of claim 14 wherein the plurality of waveguides include at least a first and second waveguide positioned vertically with respect to each other such that movement of the platform selects between the first and second waveguides depending on their vertical position relative to the substrate.

16. The optical switching system of claim 14 wherein the plurality of waveguides include at least a first and second waveguide positioned laterally with respect to each other such that movement of the platform selects between the first and second waveguides depending on their lateral position relative to the substrate.

17. The optical switching system of claim 14 wherein the plurality of waveguides include at least a first and second waveguide positioned at an angular offset with respect to each other such that movement of the platform selects between the first and second waveguides depending on their angular offset.

18. The optical switching system of claim 1 wherein the optical switch element further comprises a support structure for suspending the platform over the substrate.

19. The optical switching system of claim 1 wherein the substrate includes a cavity or air gap over which the platform is suspended.

20. The optical switching system of claim 1 wherein the optical switch element further comprises an input stationary waveguide coupled to the substrate and positioned to transmit the optical signal to either the first input or the second input of the waveguide network.

21. The optical switching system of claim 1 wherein the optical switch element further comprises an output stationary waveguide coupled to the substrate and positioned to receive the optical signal from the waveguide network.

22. The optical switching system of claim 20 wherein the optical switch element further comprises an output stationary waveguide coupled to the substrate and positioned to receive the optical signal from the waveguide network.

23. The optical switching system of claim 1 wherein the waveguide network includes a first output and a second output.

24. The optical switching system of claim 23 wherein the optical switch element further comprises an output stationary waveguide coupled to the substrate and positioned to receive the optical signal from either the first output or the second output of the waveguide network.

25. The optical switching system of claim 1 wherein the optical switch element further comprises an activation electrode coupled to the platform and wherein the actuation mechanism includes an actuation electrode positioned to interact electrostatically with the activation electrode.

26. The optical switching system of claim 25 wherein the actuation electrode and activation electrode are interdigitized.

27. The optical switching system of claim 1 further comprising an optical connector positioned at either the input to the waveguide network or the output of the waveguide network.

28. The optical switching system of claim 29 wherein the optical connector includes an alignment correction surface that corrects an alignment trajectory error of the optical signal.

29. The optical switching system of claim 28 wherein the alignment correction surface is a spherical surface.

30. The optical switching system of claim 1 wherein the waveguide network includes a waveguide surrounded by a medium, the medium being in a vacuum or air.

31. The optical switching system of claim 1 wherein the waveguide network includes a waveguide having a top, bottom and sides, where the top and sides of the waveguide are in contact with a vacuum or air while the bottom is bonded with an intermediate material with an index of refraction lower than that of the waveguide.

32. The optical switching system of claim 1 wherein the waveguide network includes a waveguide formed in a unitary structure with the substrate.

33. The optical switching system of claim 1 further comprising a sensing electrode for determining the position of the platform.

34. The optical switching system of claim 1 wherein if the platform in the first position, the optical signal switches from the first optical path to the second optical path during transmission through the waveguide network and if the platform in the second position, the optical signal is passed straight through the waveguide network.

35. The optical switching system of claim 1 wherein if the platform in the first position, the optical signal is passed straight through the waveguide network and if the platform in the second position, the optical signal switches from the first optical path to the second optical path during transmission through the waveguide network.

36. The optical switching system of claim 1 wherein the platform has a neutral position in which the optical signal does not propagate through the waveguide network and the platform moves from the neutral position to the first position or second position.

37. A method of switching an optical signal in three dimensions in an optical switch system, the optical switch system comprising a first optical switch element and a second optical switch element, the first optical switch element including a first substrate, a first platform adapted to move relative to the first substrate, a first actuation mechanism to cause the first platform to move from a first position to a second position relative to the first substrate, and a first waveguide network providing a first optical path and a second optical path and being coupled to move with the first platform;

the second optical switch element including a second substrate, a second platform adapted to move relative to the second substrate, a second actuation mechanism to cause the second platform to move from a first position to a second position relative to the second substrate, and a second waveguide network having a third optical path and a fourth optical path and being coupled to move with the second platform, the method comprising the steps of:

propagating the optical signal toward the first waveguide network of the first optical switch element;

determining whether the optical signal is to propagate along the first or second optical path of the first waveguide network of the first optical switch element;

selectively moving the first platform to a first position or a second position relative to the first substrate of the first optical switch element, whereby when the first platform is in the first position, the optical signal travels along the first optical path in the first waveguide network, and when the first platform is in the second position, the optical signal travels along the second optical path in the first waveguide network;

propagating the optical signal from the first waveguide network toward the second waveguide network of the second optical switch element;

determining whether the optical signal is to propagate along the third or fourth optical path of the second waveguide network of the second optical switch element, the third or fourth optical path of the second optical switch element being in a different plane than the first or second optical path of the first optical switch element; and selectively moving the second platform to a first position or a second position relative to the second substrate of the second optical switch element, whereby when the second platform is in the first position, the optical signal travels along the third optical path in the second waveguide network, and when the second platform is in the second position, the optical signal travels along the fourth optical path in the second waveguide network.

38. The method of claim 37 further comprising the step of correcting an alignment trajectory error in the optical signal.

39. The method of claim 38 wherein the step of correcting an alignment trajectory error in the optical signal uses a spherical surface to correct the error.

40. The method of claim 37 wherein the step of moving the first platform moves the first platform vertically relative to the substrate.

41. The method of claim 37 wherein the step of moving the first platform moves the first platform laterally relative to the substrate.

42. The method of claim 39 wherein the step of moving the first platform moves the first platform rotationally relative to the substrate.

43. The method of claim 39 wherein the step of moving the second platform moves the second platform vertically relative to the substrate.

44. The method of claim 39 wherein the step of moving the second platform moves the second platform laterally relative to the substrate.

45. The method of claim 39 wherein the step of moving the second platform moves the second platform rotationally relative to the substrate.

46. The method of claim 40 wherein the step of moving the second platform moves the second platform vertically relative to the substrate.

47. The method of claim 40 wherein the step of moving the second platform moves the second platform laterally relative to the substrate.

48. The method of claim 40 wherein the step of moving the second platform moves the second platform rotationally relative to the substrate.

49. The method of claim 41 wherein the step of moving the second platform moves the second platform laterally relative to the substrate.

50. The method of claim 42 wherein the step of moving the second platform moves the second platform rotationally relative to the substrate.

51. The method of claim 37 wherein the first waveguide network includes first and second waveguides positioned vertically with respect to each other such that movement of the first platform selects between the first and second waveguides depending on their vertical position relative to the substrate.

52. The method of claim 37 wherein the first waveguide network includes first and second waveguides positioned laterally with respect to each other such that movement of the first platform selects between the first and second waveguides depending on their lateral position relative to the substrate.

53. The method of claim 37 wherein the first waveguide network includes first and second waveguides positioned at an angular offset with respect to each other such that movement of the first platform selects between the first and second waveguides depending on their angular offset.

54. The method of claim 37 further comprising the step of sensing the position of the first platform.

55. The optical switch system of claim 1 wherein the substrate is a semiconductor.

56. The optical switch system of claim 1 wherein the substrate is quartz.

57. The optical switch system of claim 1 wherein the substrate is silica.

58. The optical switching system of claim 2 wherein the optical connector comprises an optical-to-electrical-to-optical connector.

59. The optical switching system of claim 2 wherein the optical connector comprises an bundle of optic fibers.

60. The optical switching system of claim 2 wherein the optical connector comprises a plurality of mirrors.

61. The method of claim 37 wherein the substrate is a semiconductor.

62. The method of claim 39 wherein the substrate is quartz.

63. The method of claim 39 wherein the substrate is silica.

* * * * *

UNITED STATES PATENT AND TRADEMARK OFFICE
CERTIFICATE OF CORRECTION

PATENT NO. : 6,647,170 B2
DATED : November 11, 2003
INVENTOR(S) : Ying Wen Hsu

It is certified that error appears in the above-identified patent and that said Letters Patent is hereby corrected as shown below:

Title page,
Item [56], References Cited, FOREIGN PATENT DOCUMENTS, please add the following reference:
-- JP 10-227986 Harino et al. 08/25/1988 --

Signed and Sealed this

Twenty-seventh Day of July, 2004

JON W. DUDAS
*Acting Director of the United States Patent and Trademark Office*